United States Patent [19]
Robillard et al.

[11] Patent Number: 4,937,590
[45] Date of Patent: Jun. 26, 1990

[54] THERMAL PRINTING HEAD AND CONTROLLER USING PAST PRESENT AND FUTURE PRINT DATA TO GENERATE MICROPULSE PATTERNS

[75] Inventors: Jean-Claude Robillard, Longjumeau; Roger Lepee, Fresnes, both of France

[73] Assignee: Gould Electronique S.A., Ballainvilliers, France

[21] Appl. No.: 365,663

[22] Filed: Jun. 13, 1989

Related U.S. Application Data

[63] Continuation-in-part of Ser. No. 7,216,468, Jul. 7, 1988, abandoned.

[51] Int. Cl.$^5$ .................. G01D 15/10; B41J 2/355
[52] U.S. Cl. ............................. 346/76 PH; 400/120
[58] Field of Search ............ 346/76 PH; 219/216 PH; 400/120

[56] References Cited

U.S. PATENT DOCUMENTS

| | | | |
|---|---|---|---|
| 4,364,063 | 12/1982 | Anno | 346/76 PH |
| 4,514,738 | 4/1985 | Nagato | 346/76 PH |
| 4,567,488 | 1/1986 | Moriguchi | 346/76 PH |
| 4,663,734 | 5/1987 | Berry | 346/76 PH |

FOREIGN PATENT DOCUMENTS

| | | | |
|---|---|---|---|
| 158476 | 7/1986 | Japan | 219/216 PH |
| 108072 | 5/1987 | Japan | 400/120 |

Primary Examiner—Bruce A. Reynolds
Assistant Examiner—Scott A. Rogers
Attorney, Agent, or Firm—Staas & Halsey

[57] ABSTRACT

A thermal printing head and controller include a serial input port for receiving a serial image bit means for storage of successive lines of serial image data. A multiplexer is connected to the RAMs to produce simultaneous micropulse bits. The micropulse bits are received simultaneously by serial inputs of a plurality of shift registers. The shift registers control the states of a plurality of thermal styli.

8 Claims, 6 Drawing Sheets

OUTPUT OF HISTORICAL RAM 130, 150, 160, 162, 164, 166, RESPECTIVELY

HIGH SPEED

(A)

| 1 | 2 | 3 | 4 | 5 | 6 | OUTPUT TIMINGS | CONDITION |
|---|---|---|---|---|---|---|---|
|   |   |   |   |   |   | CLK PHASE ⎍⎍⎍⎍⎍⎍ : A : B : C : D : E : F : |   |
| 1 | 0 | X | X | X | X | : 1 : 0 : 1 : 0 : 1 : 0 : | PREHEATING |
| X | 1 | 0 | X | X | X | : 1 : 0 : 1 : 0 : 1 : 0 : | HEATING, NEW DOT |
| X | 1 | 1 | 0 | 0 | 0 | : 1 : 0 : 1 : 0 : 0 : 0 : | DOTS PRINTING |
| X | 1 | 1 | 1 | 1 | 1 | : 1 : 0 : 0 : 0 : 0 : 0 : | CONTINUOUS LINE |

MEDIUM SPEED
(.1mm/s TO 50mm/s)

(B)

| 1 | 2 | 3 | 4 | 5 | 6 | OUTPUT TIMING | CONDITION |
|---|---|---|---|---|---|---|---|
|   |   |   |   |   |   | CLK PHASE ⎍⎍⎍⎍⎍⎍⎍⎍⎍⎍⎍⎍ : A : B : C : D : E : F : G : H : I : J : K : L : |   |
| X | 1 | X | 0 | 0 | 0 | : 1 : 0 : 1 : 0 : 1 : 0 : 1 : 0 : 1 : 0 : 1 : 0 : | PREHEAT & HEATING |
| X | 1 | 1 | 1 | 0 | 0 | : 1 : 0 : 0 : 1 : 0 : 0 : 1 : 0 : 0 : 1 : 0 : 0 : | DOTS PRINTING |
| X | 1 | 1 | 1 | 1 | 1 | : 1 : 0 : 0 : 0 : 0 : 0 : 1 : 0 : 0 : 0 : 0 : 0 : | CONTINUOUS LINE |

LOW SPEED
(DISCONTINUOUS PRINTING)

(C)

| 1 | 2 | 3 | 4 | 5 | 6 |   | CONDITION |
|---|---|---|---|---|---|---|---|
| X | 1 | X | X | X | X | : 1 : 0 : 1 : 0 : 1 : 0 : 1 : 0 : 1 : 0 : 1 : | ALL CONDITIONS FOR PRINTING |

THERMAL PRINTING HEAD AND CONTROLLER USING PAST PRESENT AND FUTURE PRINT DATA TO GENERATE MICROPULSE PATTERNS

BACKGROUND OF THE INVENTION

This application is a continuation-in-part of U.S. Ser. No. 07/216,468, filed on July 7, 1981, now abandoned.

The invention relates generally to thermal printing heads and controllers therefor. More particularly, the invention relates to a controller for a thermal printing head employing a duty cycle type temperature control.

Thermal printing heads have been used in a variety of applications including facsimile machines and chart recorders. In a typical facsimile machine, a printing head comprises a row of one thousand seven hundred twenty eight heating elements or thermal styli. Each of the thermal styli is connected to receive an electric current. When the electric current is supplied to a stylus, it is heated. This heating produces a darkened area on a heat sensitive piece of paper brought into proximity with the heated styli.

Recently the transport speeds for heat sensitive paper in certain types of chart recorders have been increased. A typical printing speed of two hundred millimeters per second at a line resolution of eight lines per millimeter requires printing rates of one thousand six hundred linear indicia or dots per second. Each thermal stylus must transfer a minimum amount of thermal energy to print a dot, typically, 0.3 to 0.5 millijoules. Thus, as the paper speed is increased, the temperature of the individual styli must also be increased to enable rapid transfer of a sufficient quantity of heat to darken the paper. Since the temperature of the thermal styli is rapidly raised and lowered to keep the styli at a desired temperature, the styli are subject to stress and mechanical fatigue.

In addition, whenever a straight line, such as a horizontal line for a time axis, is to be printed, selected thermal styli in the printing head must remain heated, without overheating, for the entire time that it takes to form the line.

The energy required to maintain the selected styli in the heated or printing state after being heated to printing temperature is considerably less than the energy required to raise them from ambient temperature to printing temperature. Thus, if the same amount of power is supplied to the styli on a time averaged basis, they will rapidly overheat. This can damage the styli, and cause broadening and blurring of the printed line.

To solve this problem, controls have been developed of the type disclosed in U.S. Pat. No. 4,347,518 to Williams et al., (hereinafter "Williams '518"). Williams '518 teaches a historical control for blocking the printing of adjacent character indicia as the paper is moving. A similar control is disclosed in U.S. Pat. No. 4,271,414 to Williams et al. (hereinafter "Williams '414").

Figure 1:
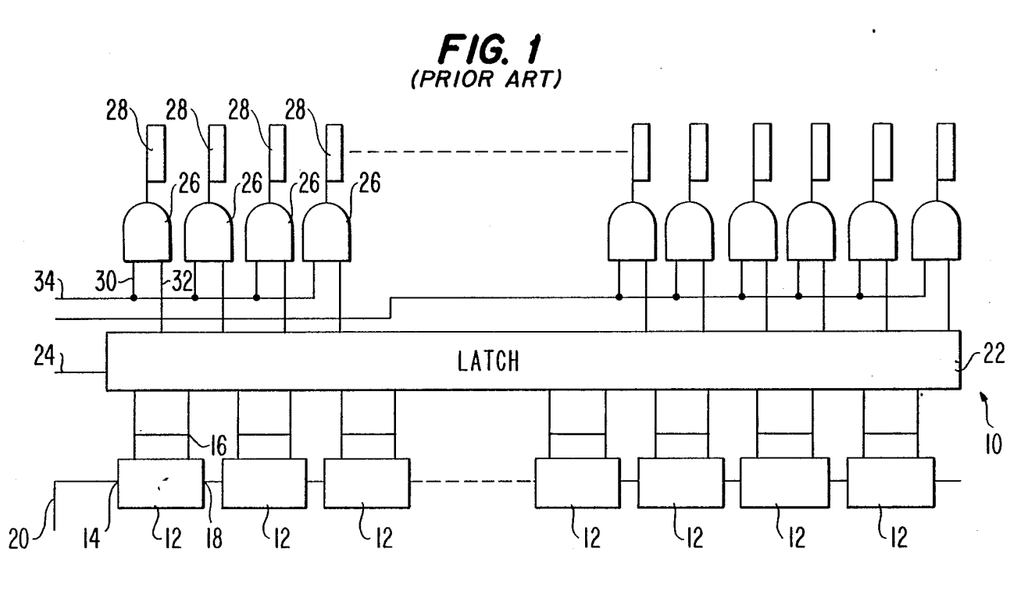
FIG. 1 is a logic diagram of a prior art thermal printing head having a single serial input shift register.

FIG. 1 shows a prior art thermal printing head 10. The thermal printing head 10 includes a plurality of shift registers 12. Each of the shift registers 12 is a serial-in, parallel out shift register having a serial input port 14, a parallel output port 16 and a serial output port 18. The respective serial output ports 18 are connected to neighboring serial input ports 14 so that the shift registers 12 receive all information at a single serial input port 20. The information is fed from the shift registers 12 into a latch 22 where it is stored. Latch 22 is cycled through storing cycles by a clock input pin 24. A plurality of AND gates 26 are connected to the outputs of the latch 22. Each of the AND gates 26 is connected to a thermal stylus 28 of the printing head 10. Each of the AND gates 26 has a clock input terminal 30 and a bit input terminal 32. The clock input terminals 30 are connected in parallel to a clock input pin 34. In operation, the information fed through the respective bit inputs 32 is received by the AND gates 26 and used to control the thermal styli 28 when the clock signal 34 activates the AND gates 26.

Figure 2:
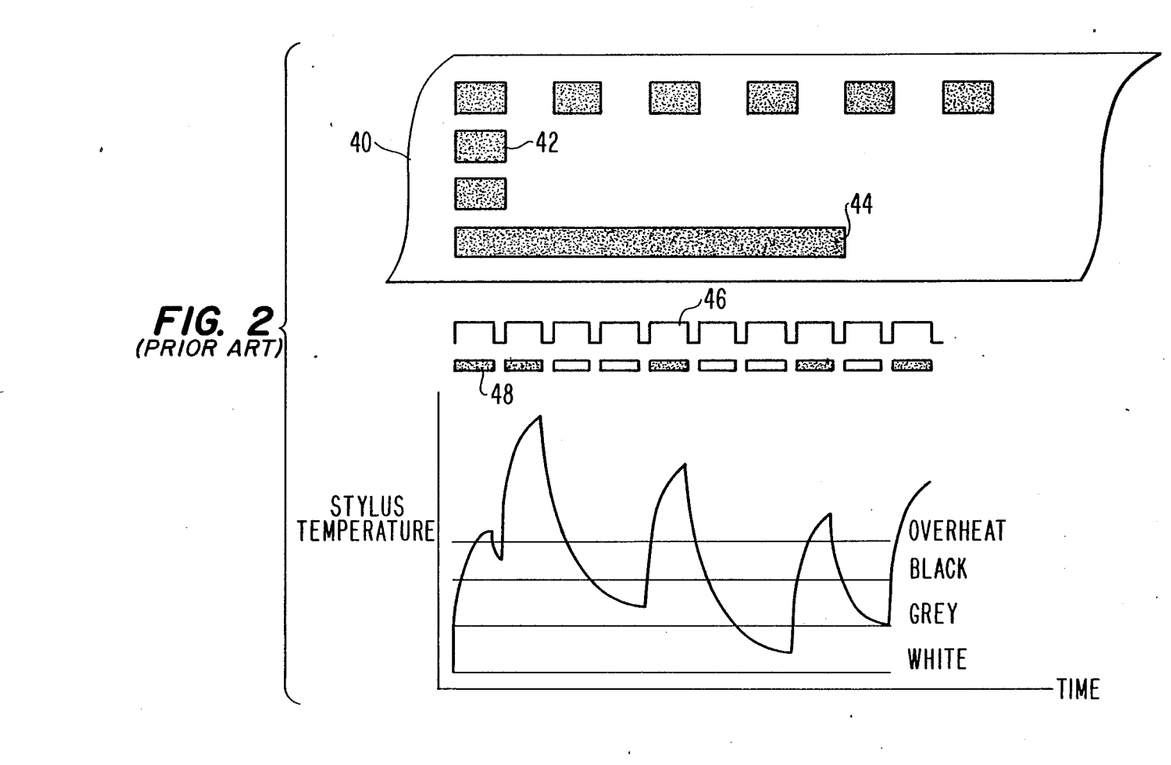
FIG. 2 is a graph showing details of the temperature fluctuations at a typical thermal stylus of the prior art head of FIG. 1.

The prior art system of FIG. 1 leads to overheating or print errors as illustrated in FIG. 2. FIG. 2 is a drawing of a portion of a typical strip of recording paper 40 having a plurality of "dots" 42 and a continuous line 44 formed thereon.

Beneath the drawing of the recording paper 40 is a graph showing a clock signal 46 in time synchronized relationship with a strip of chart paper 45. Immediately underneath the clock signal 46 a series of cells 48 are either filled in or not filled in. The cells that are filled in indicate current flow through a thermal stylus during that time interval, and the cells that are blank indicate no current flow through the stylus for that time interval. Each of the intervals is equal to the length of time that the paper is carried under the thermal stylus for which the mark was made. The pattern shown for the cells 48 corresponds to the current flow through the stylus for printing the continuous line 44. A technique called "dot skipping" is used to try and limit overheating of the stylus printing the continuous line. Current flow to the stylus is cut-off or "skipped" during a portion of the printing to allow the stylus to cool off. The stylus temperature versus time graph shows that a continuous line is formed on the paper by energizing the stylus using the "dot skipping" technique, the temperature of the stylus still overshoots and undershoots the desired temperature, causing wear on the thermal stylus and smearing of the pattern formed or causing breaks in the continuous line.

The techniques disclosed above and in Williams '518 and Williams '414 cause electric power to be delivered to the thermal styli in an "all or nothing" manner, i.e., if a dot is to be printed, a full pulse of electricity is sent to a selected stylus for the full printing time, and if no dot is to be printed, no electricity is sent to the stylus. In other words, the prior art does not provide an apparatus or a method by which the temperature of the individual thermal styli is controlled by careful modulation of the electric power supplied to the styli.

What is needed then is a method for rapidly and accurately controlling the amount of power supplied to the distributed thermal styli of the thermal head on a dynamic basis in order to produce print having good quality and to prolong the life of the thermal printing head.

SUMMARY OF THE INVENTION

It is an object of the present invention to provide a method and apparatus for accurately controlling the temperature of individual styli in a thermal printing head to keep the temperature of each stylus within a predetermined temperature range to achieve maximum printing resolution.

It is another object of the present invention to provide a micropulsing thermal printing head and controller which rapidly transfers information to a plurality of shift registers controlling the individual styli of the thermal printing head.

It is another object of the present invention to provide a thermal printing head and controller including a parallel input to a head register to decrease loading time of the head register.

It is a further object of the present invention to provide a method and apparatus which continuously loads the head registers with microlines of data, the microlines being continuously updated to enable ON/OFF switching of each stylis to accurately control the temperature of the styli.

It is an additional object of the present invention to provide a thermal printing head and controller which generates microline patterns in real time using low cost memories and programmable logic arrays to control the heating of the styli.

SUMMARY OF THE INVENTION

According to the present invention, a thermal printing head and controller of the present invention includes a serial input port for receiving an input bit stream representative of information to be printed by the thermal printing head on a moving strip of heat sensitive paper. A plurality of random access memories (for example, six) are connected in daisychained fashion to the input port to receive and store the serial image data for each line of output to be generated by the thermal printing head. The plurality of RAM's are called "historical" RAMs. The six random access memories in the above example respectively store the four previous lines of data which have already been printed by the thermal head (past data), the line of data to be printed (present data) and the line of data to be printed on the next line cycle of the thermal printing head (future data). As each new line of serial image data is fed into the first or future random access memory, the succeeding lines of image data are transferred to the neighboring random access memories in stepwise fashion.

A multiplex output is provided for feeding the outputs of the random access memories through a pattern generator. The pattern generator generates a pattern, for example, a six-bit or eight-bit pattern, for each dot of information which is to be printed. The bit pattern reflects an ON or OFF state of each thermal stylus of the thermal printing head during each of eight (for an eight-bit pattern) time intervals (microcycles or micropulses) required to print a particular dot. Thus, the pattern generators generate an output control bit stream which pulses several times, for example, eight times, for every dot or pixel to be printed. The micropulse bit streams maintain heating of the thermal printing head when printing is required while avoiding overheating of the head or individual styli.

A plurality of serial-in parallel-out shift registers, each having a serial input port, are connected to the pattern generators so that the pattern generators can rapidly load the micropulse bits indicative of the duty cycle states of each of the thermal styli for a selected micropulse of a particular dot.

A thermal printing head having a plurality of thermal styli is connected to the plurality of shift registers. Each of the thermal styli of the thermal printing head is energized in response to a positive micropulse bit. The micropulse bits control whether energy is flowing through the thermal styli during a selected micropulse.

Other objects and uses of the instant invention will become obvious to one skilled in the art upon a perusal of the following specification and claims in light of the accompanying drawings.

DESCRIPTION OF THE PREFERRED EMBODIMENT

Figure 3:
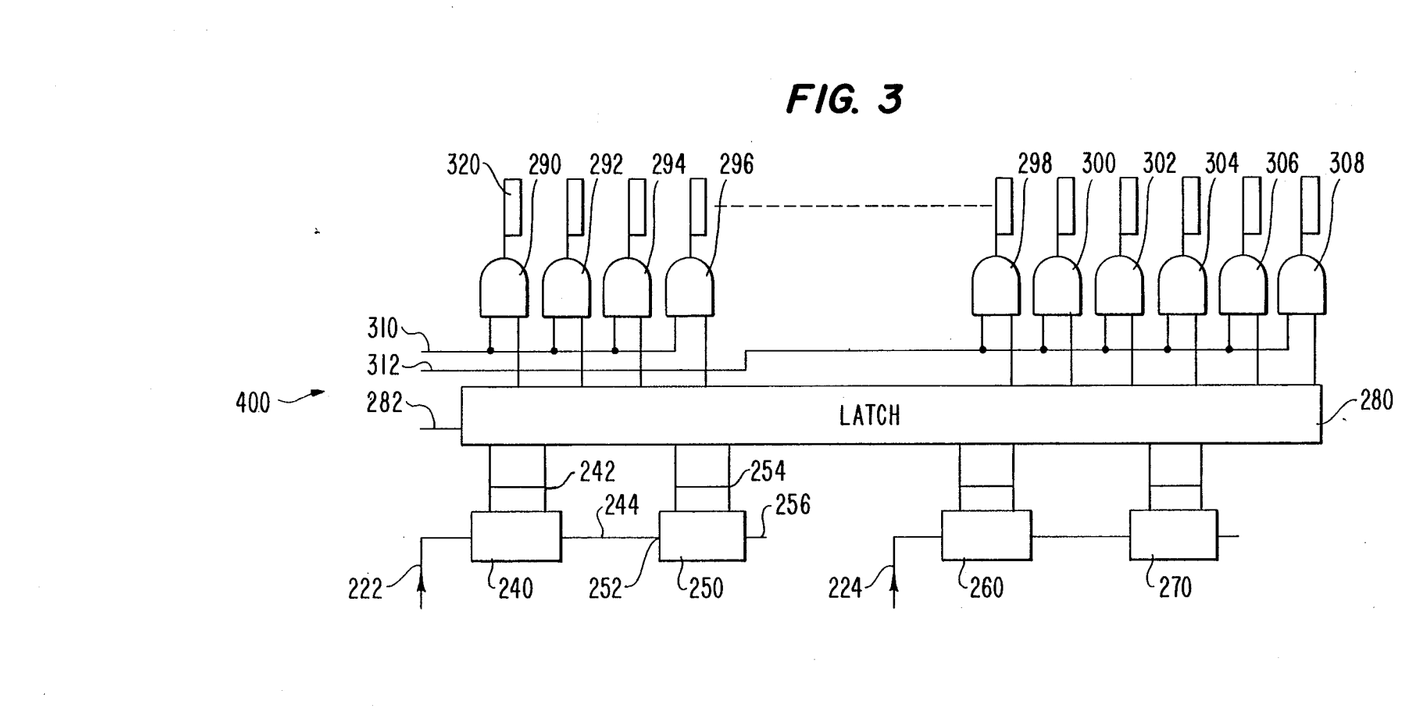
FIG. 3 is a block diagram of a thermal printing head embodying the present invention showing details of multiple serial inputs which are coupled to pattern generators for receipt of microcycle data.
Figure 4:
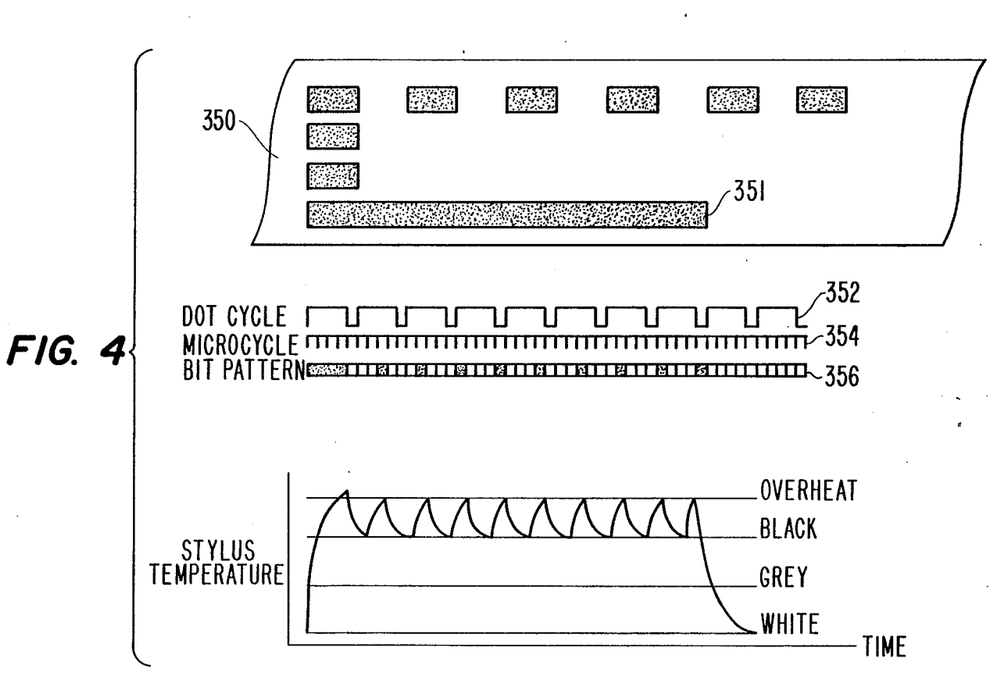
FIG. 4 is a graph of the temperature response of a typical thermal stylus operated in accordance with the present invention.
Figure 5:
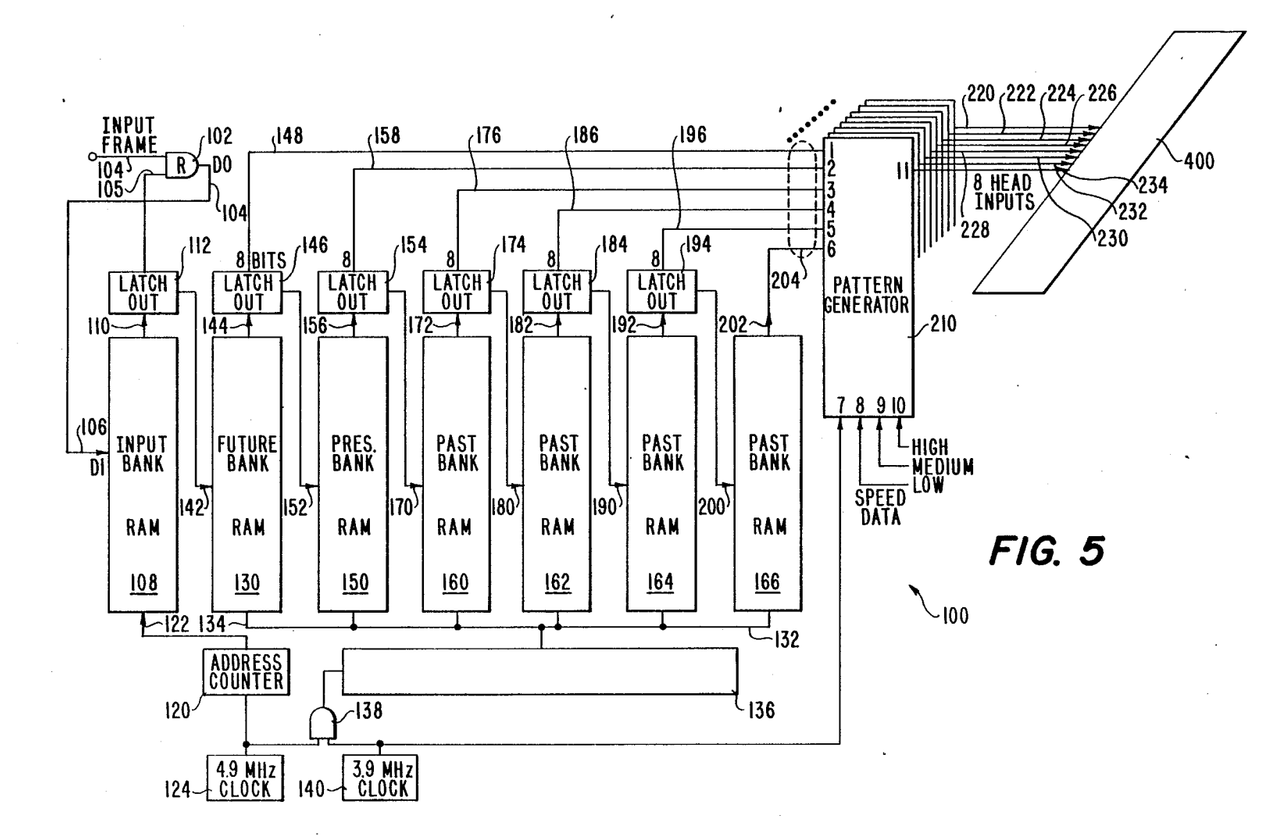
FIG. 5 is a block diagram of a thermal printing head controller embodying the present invention.

Referring to FIG. 3 through FIG. 5 and in particular to FIG. 5, a thermal printing assembly 100 embodying the present invention is shown. The present invention micropulses the heating elements (the styli) in heating or cooling pulses, so that the styli do not completely cool or overheat. The thermal printing assembly 100 includes an OR gate 102 having a pair of input pins 103 and 104. The input pin 104 comprises input means for receiving serial image data comprising an image data frame from an external source. An output pin 105 of the OR gate 102 is coupled to an input data port 106 of a random access memory 108. An output data port 110 of the random access memory 108 is connected to a latch circuit 112 The latch circuit 112 is connected to the input pin 103 of the OR gate 102. Image data is received at the input pin 104, fed through the OR gate 102 to the input port 106 where it is stored in the random access memory 108. The storage of the image data is controlled by an address counter 120 connected to an address port 122 of the random access memory 108. The address counter 120 is coupled to and driven by a clock 124 which generates a clock signal (e.g., a 4.9 megahertz clock signal). Clock 124 can be, for example, an 8.448 MHz crystal clock with a ½ divider available from MDK.

The random access memory 108 comprises an input bank and stores an entire frame of data for a selected line to be written on a strip of thermal recording paper. While read/write operations are being performed by the RAM 108 information may be compressed in order to store additional lines of data. This compression is carried out by performing a logical "OR" on each incoming frame bit and the same bit number of the previously stored frame bit. This allows n incoming frames of 3072 bits to be compressed into a single frame of 3072 bits, in which each bit will be a logical 1 if that same bit was a logical 1 in any of the n incoming frames (n is a variable number dependent on the paper speed). Each frame stored in RAM 108 is OR'ed with the incoming frame by OR gate 102.

To keep the energization of the thermal styli at a level that keeps the temperature of the styli in an optimum temperature range, the thermal head assembly processes data related to previously printed lines (past data), the lines presently to be printed (present data) and lines to be printed in the future (future data), and updates this data six times per image data frame. The input RAM 108 is connected to a RAM 130 (future RAM). The future RAM 130 is connected to an address bus 132 at an address port 134. The address bus 132 is driven by an address counter 136 coupled through a clock selection gate 138 to the clock 124 and a second clock 140 (e.g., a 3.9 megahertz clock). Clock 140 can be, for example, a 7.8 MHz crystal clock with a ½ divider available from MDK. Both address counter 120 and address counter 136 can be a standard 9 bit counter, for example, a 74ACT161 counter available from Fairchild. The future RAM 130 has a data input port 142 connected to the latch circuit 112. A data output port 144 is connected to a latch circuit 146 which feeds an eight bit latch outbus 148.

A random access memory 150 (present RAM) is connected at an input port 152 to the latch circuit 146 to receive output data from future RAM 130. The present RAM 150 is driven by the address but 132 and is connected to a latch circuit 154. The latch circuit 154 is coupled to an output port 156 and drives an eight bit bus 158. A plurality of RAMs respectively numbered, 160, 162, 164, and 166 (past RAMs) are coupled in parallel to the address bus 132. The past RAM 160 has an input port 170 for receiving data from the latch circuit 154. An output port 172 feeds data to a latch circuit 174 which is connected to a bus 176.

The past RAM 162 has an input port 180 connected to receive data from the latch circuit 174. An output port 182 is connected to the latch circuit 184 to feed data to an eight bit bus 186.

The past RAM 164 has an input port 190 connected to receive data from the latch circuit 184. An output port 192 is connected to the latch circuit 194 to drive an eight bit data bus 196.

The past RAM 166 has an input port 200 connected to the latch circuit 194. An output port 202 is connected directly to an eight bit bus 204. Image data is passed from the input bank to the future RAM 130, the present RAM 150 and the past RAMs 160 through 166 in a serial fashion during successive cycles. With each update of the image data input to the RAMs, the oldest past image data (in this example, the image line data stored in RAM 166) is discarded. Thus, each image data frame is divided into six equal micropulse units and the styli are micropulsed based on energization of the styli during each micropulse.

The information from RAMs 130, 150, 160, 162, 164 and 166 is fed to a multiplex means comprising a pattern generator 210 which is connected to the buses 148, 158, 176, 186, 196 and 204. The pattern generator 210 comprises a plurality of programmable logic array devices (PLA's) which combine the bit image patterns for each of the lines and then drive a head output bus 220 with micropulsed bits in response thereto. The PLA's can be, for example, type V22-V10 PLA's available from AMD. The head output bus comprises eight lines 222, 224, 226, 228, 230, 232, 234 and 236.

FIG. 3 is a block diagram of a thermal printing head 400. Thermal printing assembly 100 includes the serial input bus 222 and the serial input bus 224 (serial input busses 226, 228, 230, 232, 234 and 236 are not shown). Serial input bus 222 is connected to a serial in-parallel out shift register 240 having a parallel output bus 242 and a serial output bus 244. The serial output bus 244 is connected to a second serial in-parallel out shift register 250 at a serial input port 252. The shift register 250 has a parallel output port 254 and a serial output port 256. The serial output bus 244 is connected in an identical fashion to shift registers 260 and 270.

The shift registers are organized into groups with each of the groups receiving serial micropulsed bit input streams on the buses 222 through 236. The serial micropulsed data is then off-loaded via the parallel buses such as parallel buses 242 and 254 to a latch circuit 280. The latch circuit 280 has a clock input pin 282 and has a plurality of output ports connected to a plurality of AND gates respectively numbered 290, 292, 294, 296, 298, 300, 302, 304, 306 and 308. Each of the AND gates 290 through 308 has one of its input pins connected to a clock terminal such as clock terminal 310 or clock terminal 312 and its other input pin connected to receive the contents of the latch. Each of the AND gates has a thermal stylus 320 connected to it for energization. The micropulsed bits control energization of the thermal styli.

The AND gates 290–308 comprise switch means which connect the styli to the outputs of latch 280 at each micropulse. A constant current flows to each stylus for which the output of latch 280 is a logical 1. The styli will rise in temperature for the entire micropulse period. At the end of the micropulse period, the gates 290–308 turn off and the styli will cool. On the next micropulse, the data in the latch 280 will change to conform to the next input frame of data, and the styli for which a logical 1 is output will be energized. For each dot pulse, 8 micropulses are processed. The short micropulses enable accurate control of the stylus temperature.

The clock 124 generates a micropulse clock pattern. As shown in FIG. 4, a thermally sensitive strip of paper 350 has a plurality of marks made thereon including continuous line 351. Each of the marks is aligned with a dot cycle waveform 352 shown thereunder. Immediately under the dot cycle waveform is a micropulse timing array 354 (corresponding to continuous line 351) indicating that six micropulses occur during every dot or write cycle (six micropulses are shown for clarity of drawing; for an eight bit micropulsing cycle, eight micropulses would be shown). In order to avoid overheating the thermal styli, during each micropulse current is either fed (ON) or not fed (OFF) to the thermal styli 320 via the control of the AND gates 290 through 308. A bit pattern 356 represents the current flow, the darkened portions of the bit pattern reflecting energization, and the lightened cells reflecting current interruption. A typical graph of stylus temperature versus time shows that with the micropulsing technique, the thermal styli are maintained adequately heated for printing without overheating.

Each of the styli require a minimum energy to print, typically 0.3 to 0.5 millijoules/dot. The actual amount of energy required to print a dot depends upon the paper sensitivity and the heat transfer characteristic of the printing assembly and the paper. When the paper speed is increased, the writing time required to write a dot decreases. The printing time is even shorter if the printing head assembly is of a multiple strobe type, which does not allow all dots to be printed simultaneously. To keep a quality resolution, each heating element must be able to heat and cool within the alloted printing time. As the paper speed increases, decreasing the heating time available, the power requirement is increased.

The amount of energy required to heat each individual stylus to deliver the proper pattern of micropulses to form image depends on several factors. The historical pattern of dots previously printed by a particular stylus is a consideration, since prior heating of the stylus may allow a lesser amount of energy to be supplied if the stylus has not yet completely cooled off. In addition, the future print data allows a calculation to be made regarding the amount of energy that needs to be supplied to a stylus. For example, if the future data indicates that a stylus will be heated for three consecutive dot cycles, the number of micropulses required to bring the stylus to temperature, and then to maintain it at a printing temperature for three pulses, will be considered so that excess energy will not be supplied to the stylus. Other factors, including the printing status of neighboring styli, which could slow down the cooling off time for a stylus and the overall temperature of the printing head are considerations. Finally, as noted above, the speed of the paper is a consideration when determining the amount of energy to be supplied to the styli.

The influence of neighboring styli depends on the technology being used for the head. Thick film construction of the head will enable more heating influence between the styli compared with thin film construction using glass insulation. The mutual influence is typically limited to two heating styli on each side of one particular stylus. The present invention takes into account the effect of neighboring styli on the printing stylus.

The paper speed is directly computed into the micropulsing sequence.

The overall temperature of the head is measured by sensors and is used to modulate the micropulse width of the heating elements.

From the above explanation, it is clear that the temperature reached by each stylus within each dot line time will depend on the energy delivered, given by the formula:

$$E = K \sum_{i=1}^{i=8} Di \times t$$

where:
- i = the number of micropulses within a dot line time (e.g., 6 or 8, 8 in the above formula)
- t = the duration of each micropulse
- D = the data value (0 or 1) for each micropulse (i)
- K = a power conversion factor defined by the stylus resistance value and the voltage applied to the head.

As the strobes are common to all stylus by construction, the variation of t can only take in account global parameters like ambient temperature, paper speed, head temperature, common to all styli. In the prior art, this was the only way of controlling the styli temperature. The present invention introduces the parameter Di which can be modified 8 times within a dot time, consequently allowing an individual energy adjustment for each stylus. This adjustment is computed in the pattern generator, based on historical information of each stylus. The prior art performed some historical control, but the data D could not be changed within a dot time, resulting in large continuous heating time and overheating.

Figure 6:
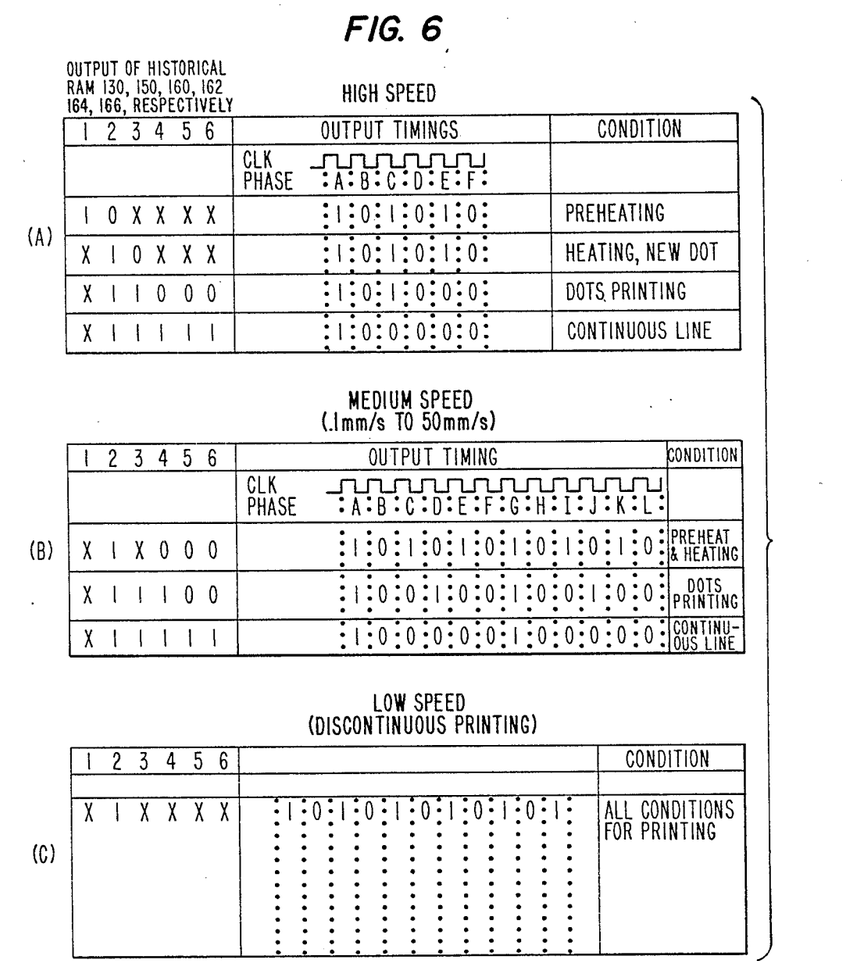
FIG. 6 is a group of truth tables showing the states of the microcycle bits for the six duty cycles comprising a single dot write cycle and the states of the thermal printing head when it is in the preheating, heating and printing modes.

FIGS. 6a-6c are charts showing the micropulse bit patterns for high, medium and slow speed operation of a printer utilizing the printing head and controller of the present invention. The high speed chart (FIG. 6a) shows an example of a 6-bit micropulse pattern used for high speed paper transport. Outputs 1-6 correspond to the respective outputs of historical RAMs 130, 150, 160, 162, 164 and 166. An "x" indicates that the pattern generator does not use the historical valve of that RAM for the print condition in question. A "1" indicates a dot printed or to be printed, and a "0" indicates no dot to be printed.

To reduce the instantaneous current consumption occurring when a continuous line is to be printed, the thermal print head of the present invention anticipates the continuous line condition. The affected styli are preheated before the actual printing time, so that less energy is needed to bring the styli up to printing temperature at the exact printing time.

The preheat condition occurs when the present RAM is in a non-writing state and the future bank is in a writing state. During the preheat condition the current to the affected thermal styli is alternately switched on (logic 1) and off (logic 0) during each successive micropulse but the temperature is kept below printing temperature.

A "new" dot is a dot printed by a stylus which has not been energized for six previous dot cycles. The significance of a new dot is that the stylus printing the new dot has had sufficient time to cool down. This requires the stylus to be preheated as described above. In other words, printing a new dot is a two step process. First, the cold stylus is preheated to a temperature just below the printing temperature. Second, the stylus is heated to printing temperature, printing the new dot. The printing of a new dot is signalled when the past RAM 160 outputs a zero while the present bank 130 outputs a one. A heating pattern identical to that for preheating during the stylus to printing temperature.

A bit pattern indicating that the present RAM and the future RAM have the same stylus asserted position (e.g., both logical 1) indicates 2 dots in a row to be printed. The selected thermal stylus is energized during the first and third cycles of the six micropulse period for each of the dots to be printed. This generates enough heat to print two dots in a row without exceeding the print temperature.

If a continuous line is to be printed, the micropulse sequence is computed using all pertinent parameters to ensure that the temperature of the stylus is maintained within the temperature required to print black. The affected thermal stylus is energized during the first micropulse period. During the succeeding five micropulse periods current does not flow in the affected thermal stylus. As noted above, this can be achieved because with a continuous line printing, a smaller amount of energy is required to maintain the stylus at printing temperature. The short period of the micropulses keeps the stylus temperature from exceeding the needed temperature, but also keeps the temperature high enough to print the line.

A medium paper speed table 6b shows the thermal stylus energization states over two 6-bit micropulses (twelve micropulses). For the preheat and heating conditions the stylus is energized in alternate micropulses. When two dots are to be printed in a row, the affected stylus is energized during the first and fourth micropulse periods of each dot cycle; during all other periods the thermal stylus is switched off.

When a continuous line is printed at a medium paper speed, the stylus is energized during the first and seventh micropulses of the twelve micropulse period.

At low speed or during discontinuous printing the thermal styli are energized every other micropulse as indicated in the low speed table 6c. At low speed, the historical value stored in the past RAMS is not utilized since the time interval between two printed dots is long enough for the styli to completely cool off. Additionally, at low speed the paper does not cool the styli as fast as it does at higher speeds.

In a preferred embodiment of the invention, each input frame comprises 3072 bits which are received at 1600 Khz (200mm/s, 8 lines/mm). Consequently, the clock 124 is a 4.9 megahertz clock. Input RAM 108 receives the input frame at a 4.9 megahertz clock frequency. This corresponds to the highest printing speed. When the printing speed is decreased, the print head continues to print at the same rate, to reduce the number of heat/cool cycles when a solid line is to be printed.

With a further reduced printing speed, the printing rate is preferably reduced by discontinuing loading of the shift registers. This is done because the heaters experience a reduced number of heat/cool cycles. This reduction in printing rate also reduces the power consumption. This can be achieved by compressing the incoming input frame in the input RAM 108. Input RAM 108 continuously reads and writes the input frames, and each read bit is ORed by OR gate 102. This produces a "ready to print" frame with no lost information between printing times.

At the beginning of each printing cycle, clock selector 138 causes the contents of input RAM 108 to be loaded into the "historical" memory banks 130, 150, 160, 162, 164, 166 via latch 112. When the transfer is completed, the clock selector switches to the normal clock 140.

In a preferred embodiment of this invention, an historical section comprises six banks: four past banks 160, 162, 164 and 166, one present bank 150, and one future bank 130. Upon each transfer of data by latch 112, the RAMs are shifted. The frame in the input RAM 108 is transferred into the future RAM 130. The data in the remaining RAMs shift into the immediately adjacent RAM, and the oldest data in the last past RAM 166 is discarded. In the preferred embodiment, each RAM is a 2k times 8 RAM, thereby defining eight blocks of 384 bits each. The eight blocks are read simultaneously by reading one byte at each of the 384 addresses. One complete frame can thus be read eight times faster than the input. As can be seen in FIG. 5, the six historical RAMs share the same address counter 136 and thus operate in parallel.

As noted above, each input frame is divided into micropulses. On each micropulse a full frame of 3072 data bits will be loaded in the thermal head shift register in eight blocks of 384 serial bits. Each bit of each pattern is computed by the pattern generators using a combination of past, present and future status of that bit.

Once every clock cycle (e.g., 3.9 megahertz), the bits of the eight blocks of each of the six banks are read in parallel. The bits are passed into eight pattern generators comprising PLA devices. The generators combine the information from each of the six banks to determine if a logical 1 or logical 0 should be sent to the thermal head. Three hundred and eighty-four clock pulses are necessary to read 8×364=3072 bits and load them into the head. At a 3.9 megahertz clock rate, a micropulse computation and transfer is achieved within 98.3 microseconds. This can be repeated six times within 0.6 milliseconds, thus loading six micropulses. On each of the six cycles, each pattern generator computes the output data based upon various consideration factors (paper speed, proximity of the stylus to an adjacent heated stylus, etc.).

The micropulse patterns may be adjusted to produce grey tone printing. For instance, fewer micropulses need to be energized to produce a grey tone on a thermal paper strip than are needed to produce a black dot. Bicolor thermal papers are also presently available wherein a red dot is printed with relatively high heat energy and block dots are printed with somewhat lower heat energy. The instant invention may be used in combination with such paper for bicolor thermal printing by energizing additional micropulses of the six bit micropulse sequence to provide red dot printing and less micropulses to produce black dot printing.

While there has been illustrated and described a particular embodiment of the present invention, it will be appreciated that numerous changes and modifications will occur to those skilled in the art and it is intended in the appended claims to cover all those changes and modifications which fall within the true spirit and scope of the present invention.

What is claimed is:

1. A thermal printing head controller for controlling a thermal printing head, comprising:
    input means for receiving a serial image data frame having n bits from an outside source;
    historical data storage means for storing the serial image data frame divided into m groups readable in parallel;
    parallel pattern generator means for dividing each of the n bits into a micropulsed group of m microbits and outputting the micropulsed group to the thermal printing head.

2. A thermal printing head controller as recited in claim 1, wherein said thermal printing head includes a plurality of shift register blocks, each shift register block having an input, so that all of said micropulsed groups are loaded to said thermal printing head in parallel.

3. A thermal printing head controller as recited in claim 1, wherein said historical data storage means includes m parallel data memory means for storing past, present and future data, said parallel data memory means being readable m times in succession for each stored serial image data frame to replace the stored serial image data frame with a sequence of m microbits which are sent to the thermal printing head.

4. A thermal printing head controller as recited in claim 3, wherein said parallel pattern generator means comprises m pattern generators, including:
    means for receiving the past, present and future data from said historical data storage means;
    means for receiving status data relating to thermal printing head temperatures and paper speed; and
    means for outputting print control signals to said thermal printing head based on said past, present and future data for each of the n bits and said status data.

5. A thermal printing head, comprising:
    thermal stylus means for printing upon receipt of a predetermined amount of electrical current;
    latch means for controlling electrical input to said thermal stylus means;

shift register means for receiving serial image data and outputting parallel image data to said latch means based on said serial image data, comprising a plurality of shift register blocks, each block including an input, so that all of the serial image data is loaded to said latch means simultaneously; and switch means for electrically coupling said latch means to said thermal stylus.

6. A thermal printing assembly, comprising:

a thermal printing head controller, including:
   input means for receiving a serial image data frame having n bits from an outside source;
   historical data storage means for storing the serial image data frame in m parallel groups; and
   parallel pattern generator means for dividing each of the n bits into a micropulsed group and outputting the micropulsed group; and a thermal printing head, including:
   shift register means for receiving said micropulsed group and outputting parallel image data.

7. A thermal printing assembly as recited in claim 6, wherein said thermal printing head includes thermal stylus means for printing upon receipt of a predetermined amount of electrical current and latch means for controlling electrical input to said thermal stylus means and wherein said shift register means comprises a plurality of shift register blocks, each block including an input, so that all of the serial image data is loaded to said latch means simultaneously.

8. A thermal printing head assembly as recited in claim 6, further comprising:
   control means for precisely controlling a temperature of said thermal printing head to enable grey tone or bicolor printing.

* * * * *

UNITED STATES PATENT AND TRADEMARK OFFICE
CERTIFICATE OF CORRECTION

PATENT NO. : 4,937,590

DATED : June 26, 1990

INVENTOR(S) : JEAN-CLAUDE ROBILLARD et al.

It is certified that error appears in the above-identified patent and that said Letters Patent is hereby corrected as shown below:

FRONT PAGE-[63], "7,216,468" should be --07/216,468--.

Column 4, line 40, after "112" (first occurrence) insert a period --.--.

Signed and Sealed this

Seventeenth Day of September, 1991

Attest:

HARRY F. MANBECK, JR.

Attesting Officer

Commissioner of Patents and Trademarks